US007024017B2

(12) United States Patent
Haruki

(10) Patent No.: US 7,024,017 B2
(45) Date of Patent: Apr. 4, 2006

(54) METHOD AND SYSTEM FOR DIGITAL CONTENTS PROTECTION

(75) Inventor: Kosuke Haruki, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 700 days.

(21) Appl. No.: 10/091,535

(22) Filed: Mar. 7, 2002

(65) Prior Publication Data

US 2002/0126874 A1 Sep. 12, 2002

(30) Foreign Application Priority Data

Mar. 8, 2001 (JP) ............................. 2001-065423

(51) Int. Cl.
*G06K 9/00* (2006.01)

(52) U.S. Cl. .................................... 382/100

(58) Field of Classification Search ................ 382/100; 713/193, 176
See application file for complete search history.

(56) References Cited

U.S. PATENT DOCUMENTS

| 6,101,602 A * | 8/2000 | Fridrich ...................... 713/176 |
| 6,249,641 B1 * | 6/2001 | Yokota ......................... 386/94 |
| 6,310,956 B1 * | 10/2001 | Morito et al. ................ 380/201 |
| 6,400,827 B1 * | 6/2002 | Rhoads ........................ 382/100 |
| 6,405,203 B1 * | 6/2002 | Collart ........................ 707/10 |
| 6,539,475 B1 * | 3/2003 | Cox et al. .................... 713/100 |
| 6,665,489 B1 * | 12/2003 | Collart ........................ 386/94 |
| 6,674,861 B1 * | 1/2004 | Xu et al. ..................... 382/252 |
| 6,674,874 B1 * | 1/2004 | Yoshida et al. ............. 382/100 |
| 6,834,349 B1 * | 12/2004 | Higurashi et al. .......... 713/193 |

FOREIGN PATENT DOCUMENTS

| JP | 11-086436 | 3/1999 |
| JP | 11-242656 | 9/1999 |
| JP | 2000-13765 | 1/2000 |
| JP | 2002-055884 | 2/2002 |
| JP | 2004-523799 | 5/2004 |
| WO | WO 02/069071 A2 | 9/2002 |

OTHER PUBLICATIONS

Notification of Reasons for Rejection mailed by Japanese Patent Office on Oct. 19, 2004, for Japanese Application No. 2001-065423, and English translation of Notification.

* cited by examiner

*Primary Examiner*—Daniel Miriam
*Assistant Examiner*—O'Neal R. Mistry
(74) *Attorney, Agent, or Firm*—Finnegan, Henderson, Farabow, Garrett & Dunner, L.L.P.

(57) ABSTRACT

There is disclosed a digital information system which has a digital contents protection function using WM information. The system uses the WM information during a first ripping processing to execute a first verification processing for verifying validity regarding use of contents. In this case, ID information of music contents as a ripping object is registered. The system uses the ID information to execute a second verification processing for verifying the validity regarding the use of the contents without executing the first verification processing using the WM information during the ripping processing of the music contents corresponding to the registered ID information.

6 Claims, 4 Drawing Sheets

| ID information | Random number value | Sector information |
|---|---|---|
| ISRC-1 | RA-1 | SEC-1 |
| ISRC-2 | RA-2 | SEC-2 |
| ⋮ | ⋮ | ⋮ |

| ID information | Random number value | Sector information |
|---|---|---|
| ISRC-1 | RA-1a | Na |
|  | RA-1b | Nb |
| ISRC-2 | RA-2a | Nc |
|  | RA-2b | Nd |
| ⋮ | ⋮ | ⋮ |

METHOD AND SYSTEM FOR DIGITAL CONTENTS PROTECTION

CROSS-REFERENCE TO RELATED APPLICATIONS

This application is based upon and claims the benefit of priority from the prior Japanese Patent Application No. 2001-065423, filed Mar. 8, 2001, the entire contents of which are incorporated herein by reference.

BACKGROUND OF THE INVENTION

1. Field of the Invention

The present invention generally relates to a digital information system for processing digital contents information, particularly to a protection technique of digital contents information such as digital audio information.

2. Description of the Related Art

In general, digital contents information such as video and music is recorded in media such as a digital video disc (DVD) and compact disc (CD), and distributed via the media. Moreover, in recent years, networks such as the Internet and digital broadcasting have generally been utilized to distribute digital contents information.

Additionally, the digital information can easily be copied, modified, or processed by a personal computer or a digital audio and video (AV) apparatus. As a modification processing, for example, a method of ripping contents (usually a PCM file) as music piece data from a music CD by a software tool called a ripper is known. The PCM file taken from the music CD by the ripping can be converted to an MP3 file by a digital compression method, for example, in MP3 (MPEG-1/2 Audio Layer III) standard. Since the MP3 file is compressed at a high compression ratio, the file is easily distributed via the Internet. Moreover, it is easy to store the file in a disk drive built in the personal computer, CD-R (writable CD) as one of exchangeable media, and the like From the background, since music contents (digital musical piece data) as digital audio information is distributed in large amounts via a CD for music, a protection function (i.e., copyright protection function) for preventing illegal copying is necessary.

As a method for realizing the protection function, a method of inserting a digital watermark (hereinafter referred to as WM information) in the music contents, constituted of a specific digital signal or digital pattern, and utilizing the WM information, is effective.

In the method of utilizing the WM information, for example, WM information indicating a copyright, and WM information indicating the number of copies are inserted beforehand in the music contents (PCM file) recorded in the CD. The personal computer or the digital AV apparatus detects the WM information from the music contents (PCM file) ripped from the music CD, and executes software for verifying validity. For example, the WM information indicates that the information can be copied. In this case, the personal computer or the digital AV apparatus checks that the ripping is valid within a limited range of the number of copies. Moreover, for example, the WM information can also indicate that copying is disabled. Then, the personal computer or the digital AV apparatus checks that ripping is invalid.

However, a verification method utilizing the WM information includes detection of the WM information and verification processing for music piece data, when all contents information recorded in the CD are, for example, music contents. Therefore, the personal computer or the digital AV apparatus is highly burdened by the verification processing, particularly, the detection processing of the WM information. This is one of the factors that reduces the use efficiency of a system resource.

BRIEF SUMMARY OF THE INVENTION

An object of the present invention is to provide a method and system in which a load on the system can be reduced in a digital information system having a protection function of digital contents information.

In accordance with one aspect of the present invention, there is provided a digital information system including facilities for digital contents protection.

The digital information system comprises:

a first verification device which detects a digital watermark from digital contents information, and verifies validity of use of the digital contents information; and a second verification device which uses identification information of the digital contents information to verify the validity of the use of the digital contents information.

The system executes the verification processing by the first verification device, for example, for the first time, when the system uses the digital contents information. Moreover, from the next time, when the digital contents information is used, the system executes the verification processing by the second verification device, and omits the verification processing including the detection processing of the digital watermark.

DETAILED DESCRIPTION OF THE INVENTION

First and second embodiments according to the present invention will be described hereinafter with reference to the drawings.

(Constitution of the System)

Figure 1:
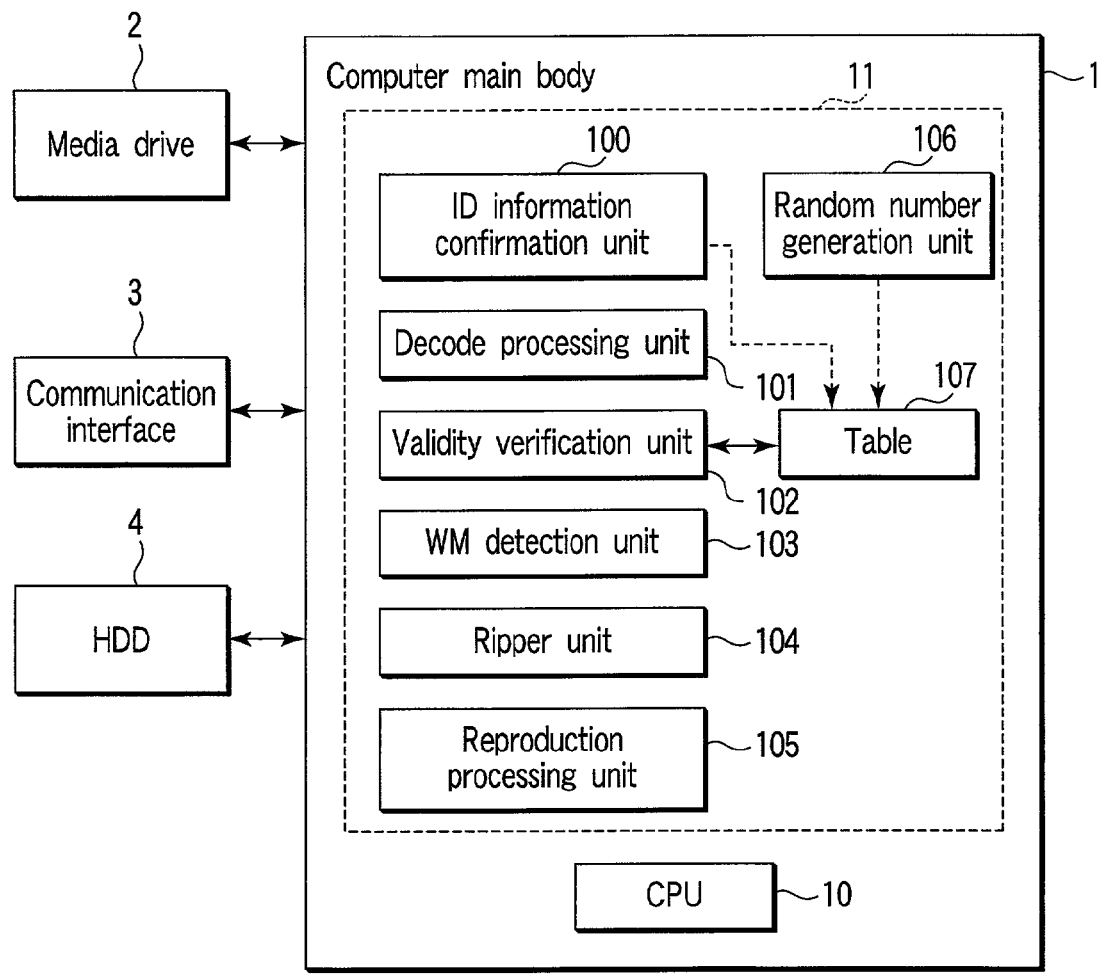
FIG. 1 is a block diagram showing a main part of a digital information system according to first and second embodiments.

FIG. 1 is a block diagram showing a system using a personal computer as a digital information system.

The present system includes a computer main body 1 including a CPU 10 and main memory 11, a media drive 2, a communication interface 3, and a hard disk drive (HDD) 4. The media drive 2 is a drive for exchangeable media (disc recording media) such as compact discs (CDs) or digital video discs (DVDs). The communication interface 3 includes hardware and software for connection to the Internet. The HDD 4 is an external storage device for storing various program module groups related to the present embodiment, digital contents information, and the like.

The CPU 10 executes software (program module group) loaded onto the main memory 11 from the HDD 4 to realize respective function units 100 to 106 shown in FIG. 1. Additionally, the software includes not only a program but also a table (table information) 107. The respective function units are an ID information confirmation unit 100, decode processing unit 101, validity verification unit 102, digital watermark (WM) detection unit 103, ripper unit 104, and reproduction processing unit 105.

The CPU 10 reads music contents information (musical data of a PCM file) from a music CD set in the media drive 2, and executes ripping processing using the ripper unit 104. In this case, the CPU 10 has a function for extracting music piece data of a piece name designated by the ripper unit 104 and executing MP3 digital compression processing. The CPU 10 stores the MP3 file obtained by the compression processing in the HDD 4 (copy function).

Furthermore, the CPU 10 decodes (extension processing) digital compressed data (MP3 files) stored in the HDD 4 by the decode processing unit 101, and reproduces music using the reproduction processing unit 105. The reproduction processing unit 105 includes D/A conversion processing, and the like, and has a function of converting sound signals so that sound can be outputted from a speaker (not shown).

(Verification Operation of First Embodiment)

Figure 2:
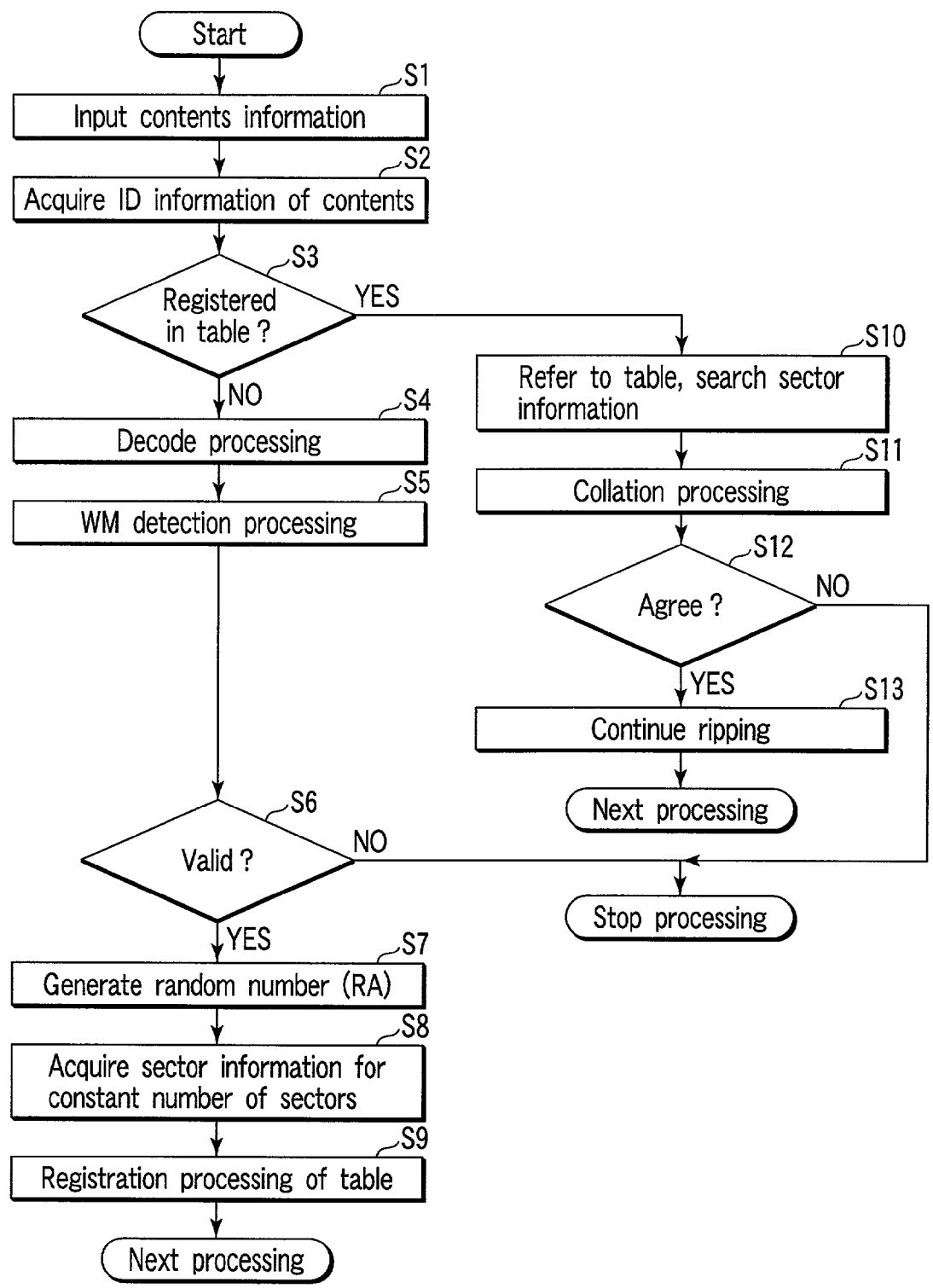
FIG. 2 is a flowchart showing a procedure of a verification processing of digital contents according to the first embodiment.

A procedure of verification processing of digital contents according to the first embodiment will be described hereinafter with reference to FIGS. 1 to 3.

In the first embodiment, it is assumed that the personal computer (computer main body 1) rips music contents (music piece data of the PCM file) of a designated music piece name from the music CD set in the media drive 2, converts the contents to an MP3 file (data compression), and stores the file in the HDD 4.

First, in response to an instruction from a user, the CPU 10 rips and reads the music contents of the designated piece name from the music CD set in the media drive 2 (step S1). Next, the CPU 10 acquires identification information (hereinafter referred to as ID information) recorded in a header portion of the music contents using the ID information confirmation unit 100 (step S2).

The ID information is an ID code for identifying the digital contents information (music piece data), and is, for example, an international standard recording code (ISRC). The ID information corresponds to an identification number of a data track of a music CD (CD-DA: CD-Digital Audio), and is a code for identifying the music contents for each music piece name, player, and record company.

Figures 3, 4, 5:
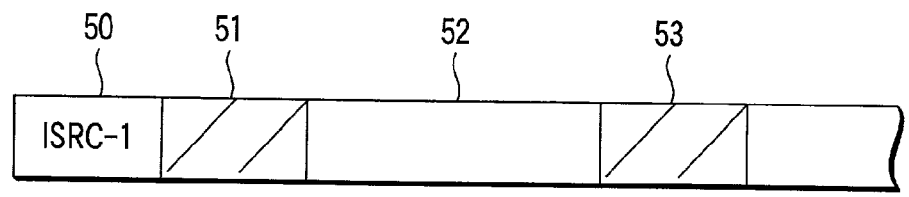
FIG. 3 is an explanatory view of a content of a table according to the first embodiment.
FIG. 4 is an explanatory view of the content of the table according to the second embodiment.
FIG. 5 is an explanatory view of a detection processing of WM information according to the second embodiment.

In the first embodiment, the CPU 10 registers the acquired ID information in the table 107 (see FIG. 3). The CPU 10 judges whether or not the acquired ID information is registered in the table 107 (step S3). Here, it is assumed that the processing is a first reading processing of the music contents information from the music CD of the media drive 2. Therefore, the ID information of the music contents information is not registered yet in the table 107 stored in the computer main body 1 (NO in step S3).

First Verification Procedure

The CPU 10 decodes/processes the music contents information (MP3 file) read and compressed from the music CD by the decode processing unit 101, and expands the compressed data (step S4). Next, the CPU 10 detects WM information inserted beforehand from the decoded/processed digital contents information (step S5).

The CPU 10 executes a predetermined verification processing procedure by the validity verification unit 103, and verifies validity regarding the use of the music contents based on the detected WM information (step S6). In the verification processing, for example, it is assumed that the WM information indicates a copy limit. The CPU 10 judges whether or not the ripping processing of the music contents (i.e., copy processing) satisfies a condition of the copy limit indicated by the WM information. Concretely, when the WM information indicates copy disabling, the CPU 10 determines that this-time ripping processing (copy processing) does not satisfy the condition indicated by the WM information and is therefore invalid (NO in step S6). When the validity cannot be verified in this manner, the CPU 10 stores the subsequent processing, that is, the MP3 file in the HDD 4, and stops (prohibits) the reproduction processing in the reproduction processing unit 105. That is, the actual ripping processing (copy processing) is discontinued.

On the other hand, when a verification result in the verification processing based on the WM information is valid, the CPU 10 generates a random number value (RA) by a random number generation unit 106 (step S7). The CPU 10 specifies a part of the music contents (a part of the music piece data) read from the music CD by the generated random number value (RA), and sets the part as secure information corresponding to ID information. Concretely, the CPU 10 acquires a sector address corresponding to the random number value (RA) from a data track corresponding to the music contents information. Moreover, the CPU 10 uses the sector address as a head address to acquire sector information (part of the musical piece data) for a constant sector (e.g., for one sector) (step S8). In this case, the sector information is digital contents information compressed by the MP3 standard. The CPU 10 associates the sector information with the ID information, and registers the information in the table 107 (step S9).

As described above, in the present system, during the ripping processing for extracting the designated music contents information from the music CD, the WM information inserted beforehand in the music contents is used to verify the validity concerning the use of the music contents. When the validity is approved by the verification processing (first verification procedure) with the detection processing of the WM information, the CPU 10 executes the registration processing of the table 107.

As shown in FIG. 3, the ID information (e.g., ISRC-1) for identifying the music contents information, the generated random number value (e.g., RA-1), and the sector address (SEC-1) for specifying the sector information (part of the music contents information) are registered in the table 107. The sector address corresponds to information for identifying a sector range for use in a second verification procedure in all sectors included in the data track (recording region of musical piece data) of the music CD.

(Second Verification Procedure)

A second verification processing using the ID information according to the first embodiment will next be described.

Similarly, it is assumed that the music contents information is read from the music CD set in the media drive 2 (step S1), and the ripping processing is executed. Similarly, the CPU 10 acquires the ID information recorded in the header portion of the music contents information from the ID information confirmation unit 100 (step S2). Here, it is assumed that the acquired ID information is the ID information (ISRC-1) registered in the table 107 (YES in step S3). That is, the music contents information designated this time in the music contents recorded in the music CD has the validity of use already approved by the first verification processing using the WM information as described above.

The CPU 10 refers to the table 107 to search for the random number value (RA-1) corresponding to the ID information (ISRC-1) and sector information (contents information corresponding to the sector address SEC-1) (step S10).

On the other hand, the CPU 10 searches for and uses the random number value (RA-1) from the table 107, obtains the sector range included in the data track of the music contents information read from the music CD, and acquires the sector information corresponding to the sector range. Moreover, the CPU 10 collates the acquired sector information with the sector information searched from the table 107, and judges whether or not the information agrees with each other (step S11).

In the case of agreement of a collation result, the CPU 10 judges that the validity regarding the use of the music contents information designated from the music CD has been verified (YES in step S12). That is, when the music contents information is the same ID information with the validity thereof approved using the WM information, the sector information acquired using the same random number value (RA-1) is the same, and the verification processing of the validity is possible.

As described above, according to the first embodiment, during the ripping processing with respect to the music contents information read from the music CD, the verification processing of the validity using the usual WM information is executed for the first time (first verification procedure). Subsequently, during the ripping processing with respect to the music contents information of the same ID information, the verification processing using the usual WM information is omitted, and the verification processing of the validity is executed using the ID information (second verification procedure). In short, when the ripping processing is executed with respect to the music contents information of the same ID information, history of the verification processing with respect to the contents information is used, and the detection processing of the WM information can be omitted in the next verification processing. Therefore, as a result, for the computer main body 1, the burden of detection processing of the WM information during the ripping processing can be reduced. In other words, with respect to the music contents information with the validity thereof once verified in the verification processing including the detection processing of the WM information, the detection processing of the WM information is not executed again. Therefore, the burden on the system of detection processing of the WM information can be reduced.

Additionally, in the first embodiment, the verification processing during the ripping processing with respect to the music contents information has been described. However, the present invention can also be applied to the verification processing during a reproduction processing with respect to the music contents information. Moreover, the present invention can be applied not only to the ripping processing from the music CD set in the media drive 2, but also to the ripping processing with respect to the music contents information downloaded from the Internet connected via the communication interface 3. Furthermore, the music contents are assumed as the digital contents information, but this is not limited, and the verification method of the first embodiment can be applied to any contents which can be identified in accordance with the predetermined ID information.

(Verification Operation of a Second Embodiment)

Figure 6:
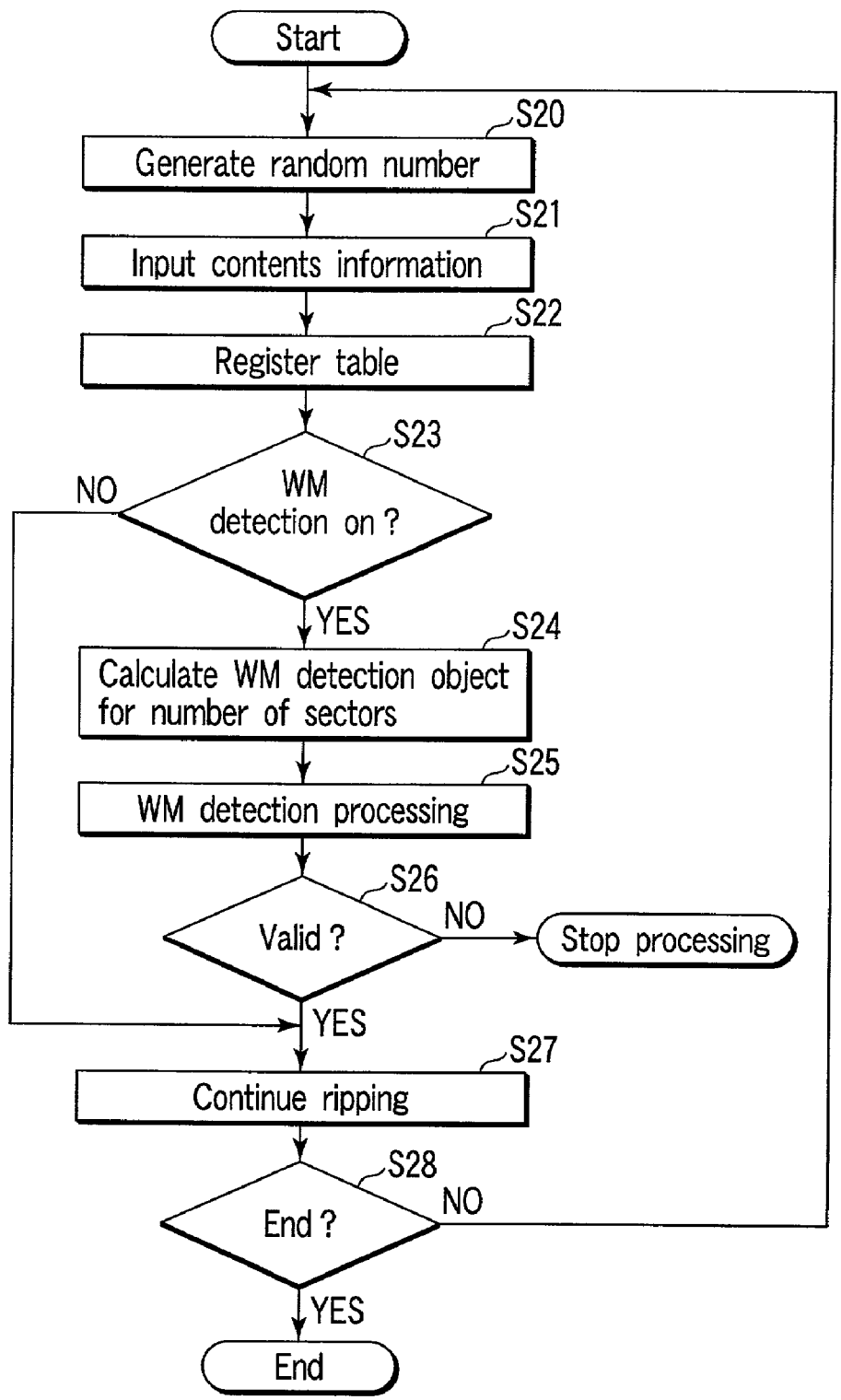
FIG. 6 is a flowchart showing a procedure of the verification processing of the digital contents according to the second embodiment.

The procedure of the verification processing of the digital contents according to a second embodiment will be described hereinafter with reference to FIGS. 4 to 6.

Also in the second embodiment, as in the first embodiment, it is assumed that the music contents information is read from the music CD set in the media drive 2, and the ripping processing is executed.

The CPU 10 generates the random number value by the random number generation unit 106, and temporarily stores the value in the main memory 11 during starting of the ripping processing (step S20). The CPU 10 reads the music contents information (PCM file) of the designated music piece name from the music CD (step S21).

Furthermore, the CPU 10 acquires the ID information (ISRC) recorded in the header portion of the music contents information using the ID information confirmation unit 100, and executes a registration processing of the information together with the random number value into the table 107 (step S22). As shown in FIG. 4, the CPU 10 associates this value with the ID information (ISRC-1), and registers the lower 1 byte of the random number value as flag information (RA-1$a$) of WM detection in the table 107. Furthermore, the CPU 10 registers the remaining byte of the random number value as a detected sector number (Na) of the WM information.

The flag information (random number value RA-1$a$) is used as a value for judging that the detection processing of the WM information is on/off. When the flag information exceeds a predetermined threshold, value, the CPU 10 controls the detection processing of the WM information to be executed. When the information is not more than the value, the processing is controlled not to be executed. In the verification method of the second embodiment, when the music contents information is subjected to the verification processing, instead of executing the detection processing of the WM information with respect to all sectors included in the data track (corresponding to a data region for one music piece) of the music CD, the detection processing of the WM information is executed only for a certain sector. Here, the processing efficiency of the system and a degree of protection of the contents (level of security) are traded off against each other due to the threshold value. That is, when the threshold value is set relatively high, the probability for executing the detection processing of the WM information is lowered. Conversely, when the threshold value is set low, the probability increases. In other words, when the threshold value is set relatively high, the probability of not executing the detection processing of the WM information increases. Therefore, the processing efficiency of the system increases, but the level of security is lowered, and strength of illegal copy prevention drops. When the threshold value is set relatively low, a reverse result is obtained.

Moreover, the detected sector number (Na) means the number of sectors for setting the range of a detection object of the WM information from a head sector address corresponding to the value of the flag information. Naturally, when the detection processing of the WM information is off, the WM detection sector number corresponding to the flag information means a range of a non detection object.

The CPU 10 refers to the table 107 to compare the flag information (RA-1$a$) with the threshold value (set value), and judges that the detection processing of the WM information is on. Then, the detection processing of the WM information is executed from the range of the detection object calculated by the sector number (Na) (YES in step S23, S24, S25). The CPU 10 verifies the validity regarding the use of the music contents based on the detected WM information in a predetermined verification procedure by the validity verification unit 102 (step S26).

According to the verification processing, for example, with the WM information for which the condition (e.g., frequency) of the ripping processing (copy processing) is limited, when the information does not satisfy the condition, the CPU 10 judges that the verification result is invalid. The execution of the ripping processing is discontinued (NO in step S26). Moreover, when the verification result in the verification processing is valid, the CPU 10 continues the ripping processing with respect to the contents information (YES in step S26, S27).

Furthermore, the CPU 10 repeats the aforementioned verification processing to a terminal end of data of the contents information (step S28). That is, the CPU 10 newly generates the random number value by the random number generation unit 106, and judges that the detection processing of the WM information is on/off. Here, when the detection processing of the WM information is judged to be off by comparison of the flag information (RA-1$b$) with the threshold value, the CPU 10 continues the ripping processing with respect to the contents information, without executing the detection processing of the WM information (NO in step S23, S27).

As described above, as shown in FIG. 5, with respect to the data track corresponding to the music contents information of the ID information (ISRC-1), the detection processing of the WM information is executed only for data regions (51, 53) for the number of sectors designated by the random number value. Therefore, the CPU 10 does not execute the detection processing of the WM information for the data region (52) of the data track. In short, without executing the detection processing of the WM information with respect to all the sectors of the music contents information, the detection processing of the WM information is executed only for a partial region designated at random by the random number. Therefore, the detection processing of the WM information can be thinned out. As a result, for the computer main body 1, the load required for the detection processing of the WM information during the ripping processing can be reduced. Moreover, since the range of the detection object of the WM information is designated at random by the random number, problems relating to security can be minimized.

Additionally, in the second embodiment, the method for generating the random number is carried out in the computer main body 1, but is not limited to this. Another method may be used in which the random number value is provided as a WM detection processing routine from a provider of the music contents. Moreover, the second embodiment can also be applied to the verification processing with respect to the music contents information during the reproduction processing. Furthermore, the present invention can also be applied not only to the ripping processing from the music CD set in the media drive 2, but also to the ripping processing for the music contents information downloaded from the Internet connected via the communication interface 3. Additionally, the music contents are assumed as the digital contents information, but this is not limited, and the verification method of the present embodiment can be applied to any contents which can be identified in accordance with the predetermined ID information.

As described above in detail, according to the system of each embodiment, when only the detection processing of the minimum WM information is executed in the digital information system having the illegal copy prevention function (copyright protection function) using the WM information, the validity concerning the use of the digital contents can be verified. Therefore, since the detection processing of the WM information for realizing the protection function of the digital contents can be reduced, the load of the system can be reduced as a result. The system of each embodiment is useful when applied to a personal computer or a digital AV apparatus having the function of processing digital contents information such as music.

What is claimed is:

1. An information system for processing digital information including contents information inserted with a digital watermark information and identification information for the contents information, said information system comprising:
    a first verification device which detects said digital watermark information from said digital information, and verifies validity of use of said contents information when the digital watermark information is detected;
    a registration device which registers the identification information for said contents information whose validity has been confirmed by said first verification device,
    wherein said registration device associates and registers, in a table, said identification information, a random number value for randomly designating sector information included in the contents information corresponding to the identification information, and the sector information; and
    a second verification device which verifies the validity of the use of said contents information by using the identification information when the validity is confirmed by the first verification device, and verifies the validity of said contents information with respect to the contents information corresponding to the identification information registered by said registration device instead of said first verification device.

2. An information system for processing digital information including contents information inserted with digital watermark information and identification information for the contents information, said information system comprising:
    a first verification device which detects said digital watermark information from said digital information, and verifies validity of use of said contents information when the digital watermark information is detected;
    a second verification device which verifies the validity of the use of said contents information by using the identification information when the validity is confirmed by the first verification device; and
    a registration device which associates and registers the identification information for said contents information whose validity has been confirmed by said first verification device, a random number value for designating sector information included in the contents information corresponding to the identification information at random, and the sector information in a table,
    wherein said second verification device refers to said table to search for the random number value and the sector information associated with the identification information which agrees with the identification information for the contents information as a verification object without executing detection processing of said digital watermark information, and
    acquires the sector information designated by the random number value from the contents information as the verification object, and verifies the validity of the use of the contents information as the verification object based on a collation result of the sector information with the sector information registered in said table.

3. A method of protecting digital information including contents information inserted with digital watermark information and identification information for the contents information in an information system, the method comprising:
- detecting said digital watermark information from said digital information, and using said digital watermark information to verify validity of use of said contents information;
- using said identification information included in the digital information whose validity has been confirmed using said digital watermark information and verifying the validity of the use of said contents information;
- associating and registering the identification information for said contents information whose validity has been confirmed using said digital watermark information, a random number value for designating sector information included in the contents information corresponding to the identification information at random, and the sector information in a table;
- referring to said table to search for the random number value and the sector information associated with the identification information which agrees with the identification information for the contents information as a verification object without executing detection processing of said digital watermark information;
- acquiring the sector information designated by the random number value from the contents information as the verification object; and
- verifying the validity of the use of the contents information as the verification object based on a collation result of the sector information with the sector information registered in said table.

4. An information system for processing digital information including contents information inserted with a digital watermark information and identification information for the contents information, said digital information system comprising:
- a detection device to set a data region for a predetermined number of sectors at random in a format in which the data region of said contents information corresponding to said identification information is divided into a plurality of sectors, to determine sector information for the number of sectors as a detection object range, and to detect said digital watermark information;
- a verification device which uses said digital watermark information detected by said detection device to verify validity of said contents information; and
- a random number generation device which generates a random number value,
- wherein said detection device designates a sector address using the random number value, and detects said digital watermark information from the detection object range of the contents information for the predetermined number of sectors in which the sector address is determined as a head sector.

5. The information system according to claim 4, wherein said detection device designates the sector address by the random number value, when said random number value exceeds a predetermined threshold value, and detects said digital watermark information from the detection object range of the contents information for the predetermined number of sectors in which the sector address is determined as the head sector.

6. A method of protecting digital information including contents information inserted with digital watermark information and identification information for the contents information in a digital information system, the method comprising:
- setting a data region for a predetermined number of sectors at random in a format in which the data region of said contents information corresponding to said identification information is divided into a plurality of sectors, and determining the sector information for the number of sectors as a detection object range;
- detecting said digital watermark information from said detection object range;
- using said digital watermark information to verify validity of use of said contents information;
- generating a random number value;
- designating a sector address by the random number value; and
- detecting said digital watermark information from said detection object range for the predetermined number of sectors in which the sector address is determined as a head sector.

* * * * *